Oct. 17, 1967 G. L. SULLIVAN ETAL 3,348,157

QUADRATURE AND HARMONIC SIGNAL ELIMINATOR FOR SYSTEMS USING MODULATED CARRIERS

Filed Aug. 28, 1964 2 Sheets-Sheet 1

*INVENTORS:*
GERALD L. SULLIVAN
JOHN W. CLAYTON JR.
*BY,* W. J. Shanley, Jr.
*ATTORNEY*

*INVENTORS:*
GERALD L. SULLIVAN
JOHN W. CLAYTON JR.

*BY,* W. J. Shanley Jr.
*ATTORNEY*

United States Patent Office 3,348,157

Patented Oct. 17, 1967

3,348,157

QUADRATURE AND HARMONIC SIGNAL ELIMINATOR FOR SYSTEMS USING MODULATED CARRIERS

Gerald L. Sullivan, Georgetown, and John W. Clayton, Jr., North Reading, Mass., assignors to General Electric Company, a corporation of New York Filed Aug. 28, 1964, Ser. No. 392,855
20 Claims. (Cl. 329—50)

ABSTRACT OF THE DISCLOSURE

A quadrature and harmonic signal eliminating circuit for modulated carrier input signals. A modulated carrier is applied to first and second switching means controlled by an A-C signal of one-half the carrier frequency either in phase with or 90° out of phase with the signal. The output is coupled to third and fourth switches controlled by a similar A-C signal which is 90° phase displaced from the first A-C signal. The output signal from the third and fourth switching means is one-half the carrier frequency with undesired noise and phase components eliminated.

*Background of the invention*

This invention relates to improved circuits for eliminating from a modulated carrier signal phase components in quadrature with the preferred phase of the carrier and eliminating or attenuating frequency components that are harmonics or subharmonics of the preferred carrier frequency.

While this invention is not limited to use in servo systems, it has been found to have principal utility in such systems since the elimination of the quadrature components of the incoming signal as well as noise signals at frequencies other than the carrier frequency result in preventing the saturation of system components, and it also prevents the introduction of errors into the servo system. In accordance with the invention, quadrature and noise rejection is provided in various types of modulated carrier responsive circuits commonly utilized in servo systems.

One type of servo circuit commonly utilized is provided solely to strip the quadrature phase and noise components from the modulated carrier signal so that the modulated carrier output signal is modulated with information obtained from the modulation of the preferred phase component. Another type of servo circuit found to be useful not only strips the quadrature phase and noise components from the carrier signal but also demodulates the carrier signal to provide a modulated D-C output signal. Yet another type of servo circuit performs a quadrature and noise components rejection function while also operating as a frequency halver circuit in those systems wherein the signal intelligence is contained within a carrier which is a second harmonic of the supply frequency. In such circuits the preferred phase of the polarity reversible second harmonic signal is converted to a polarity reversible signal of a specific phase; i.e., the preferred phase at the supply frequency, while rejecting the quadrature phase of the second harmonic signal and rejecting noise components at the fundamental frequency and at other harmonic frequencies.

Heretofore, prior art quadrature eliminators for providing a modulated carrier output signal utilized a first switching network for demodulating the modulated carrier signal, a filter network for excluding all but the D-C component, and a second switching network for modulating a carrier of the desired phase in accordance with this D-C component. These prior art arrangements have been found to be relatively complex and costly. In addition, the output signals of half-wave types of quadrature eliminators have been found to contain, in addition to the modulated carrier signal, a transient D-C component which must be attenuated to prevent its application to subsequent amplifiers and servomotors. Attenuation of this component is normally obtained in prior art systems by reducing the size of amplifier coupling and by-pass capacitors. This approach, however, reduces the gain of the amplifier for the modulated carrier portion of the signal and makes the gain a function of capacitor tolerances and temperature coefficients. It also impairs the effectiveness of the by-pass capacitors in reducing power supply ripple and decoupling the amplifier stages.

It is therefore an object of this invention to provide a new and improved quadrature and noise component eliminator of simplified design for use with modulated carrier signal systems.

It is another object of this invention to provide a new and improved quadrature and noise component rejection circuit for use with modulated carrier signal systems which provide a modulated carrier output signal that is free of D-C modulation transients.

It is a further object of this invention to provide a new and improved quadrature and noise rejection circuit for use with a modulated carrier signal system which is capable of providing a modulated carrier output signal while utilizing only a single switching network.

Most sensing or conversion devices which provide modulated second harmonic signals employ subtractive cancellation to eliminate fluxes or voltages at the supply frequency. This cancellation is seldom perfect because of phase and/or magnitude differences in the supply frequency components. Consequently, an output is developed at the supply frequency which must be rejected by external means. Rejection is necessary to prevent errors from being developed in measurement of the second harmonic signal, or in detection of the second harmonic null. Similarly, any quadrature component of the second harmonic signal and noise components at higher frequencies must be effectively rejected, while in-phase second harmonic signals must be transmitted in proportion to their input magnitude. Furthermore, it is necessary to transpose the frequency of the signal to match the supply frequency, and to reproduce the signal with a well-defined supply frequency phase.

It is therefore another object of this invention to provide a new and improved frequency halver for converting the preferred phase of a second harmonic signal into a polarity-reversible signal of a specific phase at the supply frequency while rejecting the quadrature phase of the second harmonic signal and rejecting noise components at the fundamental frequency and at other harmonic frequencies.

*Summary*

In accordance with the basic form of the invention, a switching network comprising first and second switching devices having control electrodes for controlling their conductive states is connected to alternately apply an incoming modulated carrier signal to third and fourth switching devices in a second switching network. The switching devices are controlled by A-C control signals bearing predetermined phase relationships with the preferred phase component of the input signal. The output of the third and fourth switching devices is a voltage which varies in accordance with the modulation information on the input signal in phase with the preferred phase and at half the frequency.

*Brief description of the drawings*

For a better understanding of this invention, reference may be had to the following description taken in connection with the accompanying drawings, in which.

*Description of the preferred embodiments*

Figure 1:
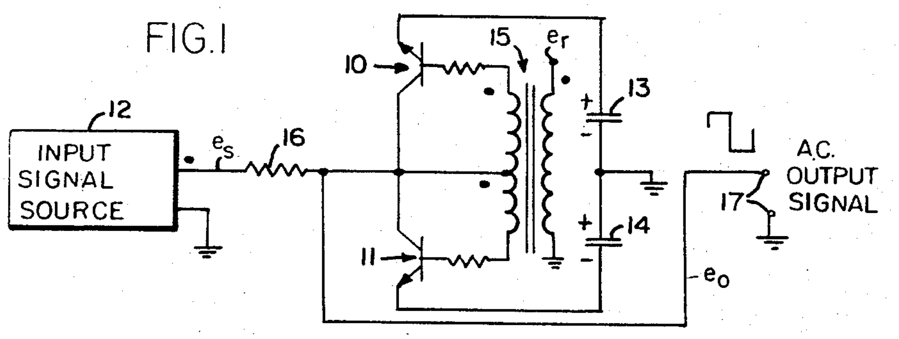
FIG. 1 is a schematic representation of the basic form of the quadrature and noise rejection circuit of the invention.

Referring now to FIG. 1, there are illustrated chopper transistors 10 and 11 which serve as switching means to convert alternate half cycles of the modulated carrier signal from source 12 to D-C potentials upon capacitors 13 and 14 under control of the reference signal source $e_r$ which is an A-C voltage control signal. Chopper transistors 10 and 11 operate as synchronous switches which close; i.e., assume their low resistance state in response to the base of the transistor becoming positive with respect to the collector. Conversely, the transistors open when the base becomes negative with respect to the collector.

Means is provided by transformer 15 to alternately operate transistors 10 and 11 in response to square wave reference signal $e_r$. For the purposes of this discussion, when switches 10 and 11 are closed, their resistance between collector and emitter is substantially zero as compared to the resistance of resistor 16 which couples the input signal source 12 to the transistors 10 and 11. Thus, the values of resistor 16 and capacitors 13 and 14 determine the RC time constant of the demodulator. To perform the demodulation function, this time constant should be long with respect to the period of signals $e_s$ so that capacitors 13 and 14 will integrate the alternate half cycles of the input signal.

Figure 6:
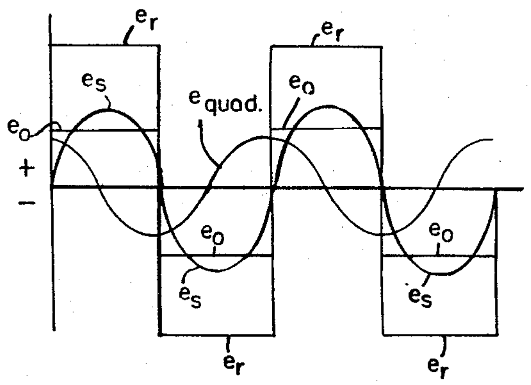
FIG. 6 shows wave forms obtained at particular locations in the circuit of FIG. 1 and useful in explaining the operation thereof.

Referring now to FIG. 6, assuming that $e_s$ and $e_r$ are in phase and that the polarity dots in the figures represent points that are positive or going positive at zero time; and assuming further that $e_s$ is in the illustrated unmodulated steady state condition, capacitor 13 will then be connected to the signal source 12 in the first half cycle of $e_s$ so as to maintain its charge at $+e_o$. Capacitor 14 will be maintained at $-e_o$ during the second half cycle by conduction through transistor 11. Thus, chopper transistors 10 and 11 synchronously demodulate the preferred phase component $e_s$ to provide D-C potentials which are equal to the average values of the positive and negative half cycles of $e_s$. These potentials are alternately connected to output terminals 17 to provide the required modulated carrier output signal. Thus, it will be appreciated that a modulated square wave output signal will be provided upon output terminals 17 with the magnitude of the square wave bearing the modulation information which is contained upon the preferred phase component $e_s$.

It will be appreciated that the quadrature component $e_{quad.}$ of the input signal which is 90° phase displaced from the preferred phase component $e_s$ will have no net effect upon the voltage appearing across capacitors 13 and 14 since during the first half cycle of $e_r$ no net charge will be added to capacitor 13. During the second half cycle of $e_r$, $e_{quad.}$ will have no net effect upon the charge upon capacitor 14. Thus, it can be seen that, in accordance with our invention, the modulation information upon the preferred phase component $e_s$ is extracted and stored upon capacitors 13 and 14 where it is utilized to modulate the reference carrier signal $e_r$ to provide the desired full wave output signal $e_o$. It will also be appreciated that even harmonic noise components of the input signal will produce no net charge upon the capacitors and that the odd harmonics noise components will be attenuated in direct proportion to their harmonic multiple.

It will be recognized that this configuration involves the sampling of the charge stored upon capacitors 13 and 14 at the same time that the capacitors are connected to the input signal source to integrate the applied signal. This configuration has been found to be suitable for normal applications in which a high resistance load is connected to output terminals 17. If, however, the circuit is loaded down by a low resistance load, then additional isolation may be provided by utilizing the modification of FIG. 2 wherein chopper transistors 18 and 19 are utilized to sample the voltages on capacitors 13 and 14 at times when they are not performing their integration function. The secondary of control transformer 20 is polarized in the indicated manner to provide the required isolation between the load and modulated carrier signal source 12. Chopper transistor 18 is thus rendered nonconductive while chopper transistor 10 is conductive, and at the same time, chopper transistor 19 is rendered conductive to sample the charge previously stored upon capacitor 14. On the next half cycle the reverse action occurs, thus providing the required isolation.

Figures 2, 3:
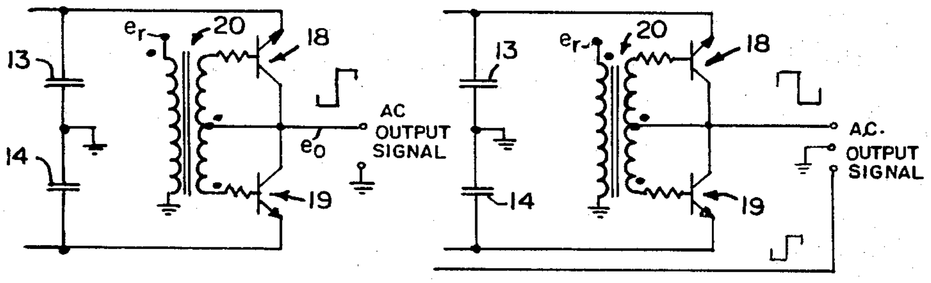
FIG. 2 is a schematic representation of a modification of the system of FIG. 1 to obtain isolation between the signal source and the load.
FIG. 3 is a schematic representation of a modification of the embodiment of FIG. 1 to provide a push-pull, A-C output signal.

It is another feature of this invention that a push-pull, modulated carrier output signal may be provided without necessitating the use of a transformer by connecting output terminals 17 to the point common to chopper transistors 18 and 19 and the point common to chopper transistors 10 and 11 in the manner illustrated in FIG. 3.

Figure 4:
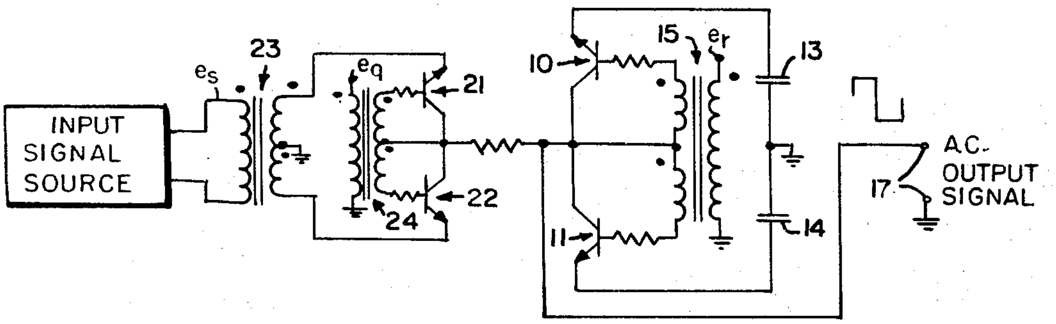
FIG. 4 is a schematic representation of a quadrature and noise component rejection circuit as applied to a frequency halver which provides a modulated carrier output.

Referring now to FIG. 4, there is illustrated a frequency halver which rejects the quadrature phase of the second harmonic signal and noise components at the fundamental frequency and at other harmonic frequencies to provide a modulated carrier output signal at the supply frequency, the modulation being proportional to the information carried by the preferred phase component of the input signal.

It may be seen that the output portion of the circuit of FIG. 4 is identical with the circuit of FIG. 1 and consequently corresponding elements will be identified with like reference numerals. Chopper transistors 21 and 22 which constitute additional switching means are provided in order to provide the frequency halving function in cooperation with input transformer 23 and control transformer 24.

Figure 7:
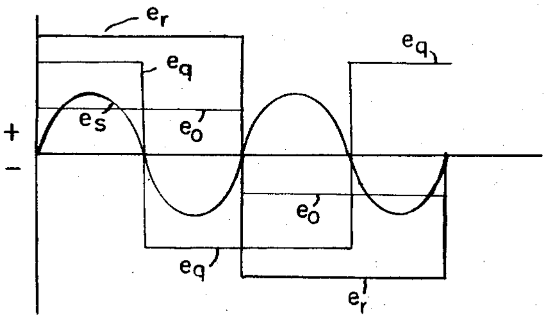
FIG. 7 shows wave forms obtained at particular locations in the circuit of FIG. 4 and useful in explaining the operation thereof.

Referring now to FIG. 7, it may be seen that, in addition to reference signal $e_r$, an additional A-C reference voltage signal in quadrature therewith; i.e., $e_q$, is provided to generate an output signal $e_o$ which is half the frequency of the preferred phase component $e_s$ of the input signal. The operation of the circuit of FIG. 4 will be explained with reference to FIG. 7 by describing the circuit operation during four half cycles of preferred phase component $e_s$. Reference signal $e_q$ is illustrated as being of lesser magnitude than $e_r$ solely for the purpose of clarity of presentation. Thus their difference in magnitude is of no significance since they only perform switching functions. During the first half cycle of $e_s$, chopper transistors 21 and 10 have positive signals applied to their bases, thus resulting in the application of the input signal to capacitor 13, thus resulting in a positive charge being introduced thereon. On the second half cycle $e_s$, transistor 22 and transistor 10 will be in their conductive states to continue to modify the positive charge upon capacitor 13. During the third half cycle of $e_s$, transistors 22 and 11 are conductive, thus resulting in the application of a negative charge to capacitor 14. This negative charge will be altered during the fourth half cycle of $e_s$ since chopper transistors 21 and 11 will then be conductive. In a manner previously explained, the output signal appearing upon terminals 17 will be in phase with reference carrier signal $e_r$, thus resulting in the conversion of the second harmonic signal $e_s$ into a square wave phase locked to reference signal $e_r$. The magnitude of this square wave is proportional to the magnitude of $e_s$, and its polarity will reverse with reversals of the polarity of $e_r$. It will be appreciated that if the output signal is to be phase-locked to $e_q$ rather than $e_r$, it is only necessary to reverse their connections to transformers 15 and 24.

As will be evident in view of the previous discussion with respect to FIG. 6, the component in quadrature with preferred phase component $e_s$ of the input signal has no net effect upon the charge stored during each half cycle of preferred phase component $e_s$. The circuit thus rejects second harmonic signals in quadrature with the preferred phase component.

Assuming a signal of the same frequency and phase as $e_r$ was applied rather than a second harmonic signal, there would be a positive charge added to capacitor 13 during the first interval and an equal negative charge added during the second interval, resulting in no net change in the charge upon capacitor 13. A similar situation occurs with respect to the charge upon capacitor 14 during the third and fourth intervals. Thus, there would be no output at terminals 17 if solely a supply frequency signal of phase $e_r$ were applied.

Assuming now that $e_s$ was replaced by a signal of the same frequency and phase as $e_q$, the action during the first two intervals will result in causing a positive charge to be stored upon capacitor 13 while the action during the third and fourth intervals will be opposite to that for the normal second harmonic signal $e_s$, thereby causing a positive charge to be stored upon capacitor 14. Consequently, there will be no A-C output under this condition since the alternate sampling of the voltages of capacitors 13 and 14 will provide a D-C output rather than modulated full wave A-C. This illustrates that a fundamental frequency input of any phase will be rejected in addition to the quadrature component of the second harmonic signal.

Figure 5:
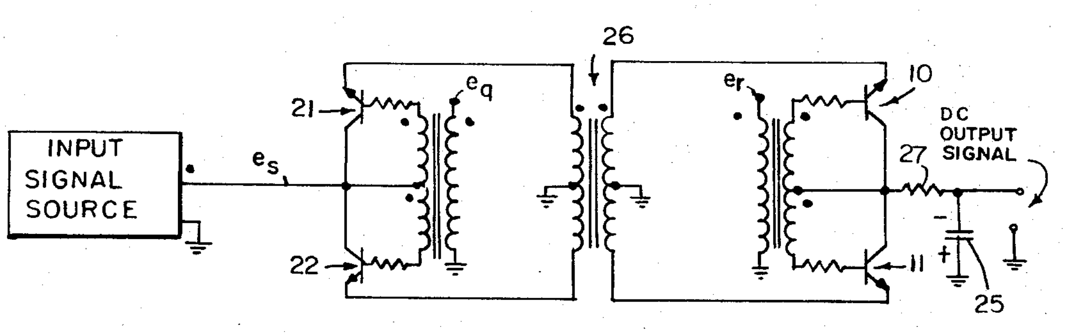
FIG. 5 is a schematic representation of a quadrature and noise component rejection circuit as applied to a frequency halver and demodulator which provides a modulated D-C output.

In many applications it is desirable to provide a modulated D-C output in situations wherein the modulation information is contained in the second harmonic of reference frequency $e_r$, in which case the embodiment of FIG. 5 is suitable. The circuit as shown will provide a polarity-reversible D-C output signal upon capacitor 25 which is proportional solely to the modulation upon the preferred phase component $e_s$ in a manner which will be obvious from the preceding discussion.

Therefore, while particular embodiments of the subject invention have been shown and described herein, they are in the nature of description rather than limitation, and it will occur to those skilled in the art that various changes, modifications and combinations may be made within the province of the appended claims without departing either in spirit or scope from this invention in its broader aspects; for example, it will be appreciated that the invention is equally applicable to servo lead networks of the type disclosed in United States Patent 3,005,139 to Chin et al., issued Oct. 17, 1961, and assigned to the same assignee.

What we claim as new and desire to secure by Letters Patent of the United States is:

1. A quadrature signal eliminator comprising, first and second switching means each comprising two current-conducting electrodes and a control electrode, said switching means presenting a low resistance between said current-conducting electrodes when said control electrode has a voltage signal of a given polarity applied between said control electrode and one of said current-conducting electrodes, means adapted to be energized with modulated carrier input signals containing a preferred phase component bearing modulation information, an undesired phase component in quadrature therewith and harmonic noise components for connecting said input signals between one of the current-conducting electrodes of each of said switching means and a fixed reference potential, a source of said voltage signals connected to apply said voltage signals between the control electrode and said one current-conducting electrode of each of said switching means so that said switching means are alternately in said low resistance state, said voltage signals being phased with respect to said preferred phase so that every polarity reversal of said voltage signal coincides with a polarity reversal of said preferred phase component, and means coupled between the other conducting electrodes of each of said switching means and said fixed reference potential for providing a voltage which varies in response to the modulation information present upon said preferred phase component.

2. A quadrature signal eliminator comprising, first and second switching means, each being rendered alternately conductive and nonconductive in response to the application of an A-C control signal and including input and output terminals, means adapted to be energized with modulated carrier input signals containing a preferred phase component bearing the modulation information, an undesired phase component in quadrature therewith and harmonic noise signals for connecting said input signals between the input terminals of said first and second switching means and a fixed reference potential, a source of said A-C control signals connected to alternately render said first and second switching means conductive, said control signal being phased with respect to said preferred phase so that every polarity reversal of said A-C control signal coincides with a polarity reversal of said preferred phase component, means coupled between the output terminals of said first and second switching means and said fixed reference potential for providing voltages which are equal and opposite with respect to said reference potential and vary in response to the modulation information present upon said preferred phase component, and an output circuit coupled to a point common to said input terminals of said switching means and said fixed reference potential for providing a modulated carrier output signal the modulation of which is proportional to the modulation information present upon said preferred phase component.

3. The combination of claim 2 in which said connecting means comprises a series resistance, said voltage providing means comprises first and second equal value capacitances connected between said fixed reference potential and the output terminals of said first and second switching means, respectively, the value of said capacitances and said series resistance serving to provide a time constant that is long with respect to the period of said A-C control signals.

4. The combination of claim 3 in which said switching means each comprises a device having a control electrode, a current emissive electrode and a current collector electrode, said device presenting a low resistance between said current emissive and current collector electrodes when said control electrode has a voltage of a given polarity applied between said control electrode and one of said other electrodes, said one electrode of each device being connected in common and serving as said input terminals to said switching means, and in which said source of A-C control signals comprises a transformer having a center-tapped secondary winding one end of which is connected to said control electrode of said first switching device, the other end thereof being connected to said control electrode of said second switching device,
said center-tap being connected to the point common to both said other electrodes.

5. A quadrature signal eliminator comprising,
first, second, third, and fourth switching means, each being rendered alternately conductive and nonconductive in response to the application of an A-C control signal and having input and output terminals,
means adapted to be energized with modulated carrier input signals of a given frequency containing a preferred phase component bearing the modulation information and undesired phase component in quadrature therewith and harmonic noise components for connecting said input signals between the input terminals of said first and second switching means and a fixed reference potential,
means for coupling the output terminals of said first and second switching means to the input terminals of said third and fourth switching means,
a first source of said A-C control signals connected to alternately render said first and second switching means conductive,
a second source of said A-C control signals connected to alternately render said third and fourth switching means conductive, the frequency of said first and second A-C control signals being one-half of said given frequency, said A-C control signals being 90° phase displaced with respect to each other and being phased with respect to said preferred phase so that every polarity reversal of said A-C control signals coincides with a polarity reversal of said preferred phase, and
means coupled between the output terminals of said third and fourth switching means and said fixed reference potential for providing a voltage which varies in response to the modulation information present upon said preferred phase component.

6. A quadrature signal eliminator comprising,
first, second, third, and fourth switching means, each being rendered alternately conductive and nonconductive in response to the application of an A-C control signal and having input and output terminals,
means adapted to be energized with modulated carrier input signals of a given frequency containing a preferred phase component bearing the modulation information and undesired phase component in quadrature therewith and harmonic noise components for connecting said input signals between the input terminals of said first and second switching means and a fixed reference potential,
means for coupling the output terminals of said first and second switching means to the input terminals of said third and fourth switching means,
a first source of said A-C control signals connected to alternately render said first and second switching means conductive,
a second source of said A-C control signals connected to alternately render said third and fourth switching means conductive, the frequency of said first and second A-C control signals being one-half of said given frequency, said A-C control signals being 90° phase displaced with respect to each other and being phased with respect to said preferred phase so that every polarity reversal of said A-C control signals coincides with a polarity reversal of said preferred phase,
means coupled between the output terminal of said third switching means and said fixed reference potential for providing a first voltage of given polarity which varies in response to the modulation information present upon said preferred phase component, and
means coupled between the output terminal of said fourth switching means and said fixed reference potential for providing a second voltage of polarity opposed to said given polarity and which varies in response to the modulation present upon said preferred phase component.

7. The combination of claim 6 further comprising an output circuit coupled between a point common to the input terminals of said third and fourth switching means and said fixed reference potential for providing a modulated carrier output signal having a frequency half that of said given frequency, the modulation present on said carrier being proportional to the modulation present upon said preferred phase component of said input signal.

8. The combination of claim 7 in which said input signal connecting means comprises first means energized by said input signals and connected between the input terminal of said first switching means and said fixed reference potential for applying to said first switching means a first signal proportional to said modulated carrier input signal, and second means energized by said input signals and connected between the input terminal of said second switching means and said fixed reference potential for applying to said second switching means a second signal proportional to said modulated carrier input signal, said first and second signals being 180° out of phase.

9. The combination of claim 8 in which said coupling means comprises means for resistively coupling a point common to the output terminals of said first and second switching means to a point common to the input terminals of said third and fourth switching means.

10. The combination of claim 9 in which said first and second voltage providing means each comprises a capacitance of given value connected between said fixed reference potential and the output terminals of said third and fourth switching means, respectively, the resistance of said resistive coupling means and said given value of capacitance being such that they provide a time constant which is long with respect to the period of said A-C control signals.

11. The combination of claim 6 further comprising an output circuit,
fifth switching means for selectively connecting said output circuit to said first voltage providing means,
sixth switching means for selectively connecting said output circuit to said second voltage providing means,
said second source of A-C control signals being connected to alternately render said fifth and sixth switching means conductive in a 180° out-of-phase relationship with respect to said third and fourth switching means, respectively, whereby said output circuit is isolated from said input signal connecting means.

12. The combination of claim 11 in which said input signal connecting means comprises first means energized by said input signals and connected between the input terminal of said first switching means and said fixed reference potential for applying to said first switching means a first signal proportional to said modulated carrier input signal, and second means energized by said input signals and connected between the input terminal of said second switching means and said fixed reference potential for applying to said second switching means a second signal proportional to said modulated carrier input signal, said first and second signals being 180° out of phase.

13. The combination of claim 12 in which said coupling means comprises means for resistively coupling a point common to the output terminals of said first and second switching means to a point common to the input terminals of said third and fourth switching means.

14. The combination of claim 13 in which said first and second voltage providing means each comprises a capacitance of given value connected between said fixed reference potential and the output terminals of said third and fourth switching means, respectively, the resistance of said resistive coupling means and said given value of capacitance being such that they provide a time constant which is long with respect to the period of said A-C control signals.

15. The combination of claim 6 further comprising fifth and sixth switching means connected in series between a point common to said third switching means and said first voltage providing means and a point common to said fourth switching means and said second voltage providing means and an output circuit connected between a point common to said third and fourth switching means and a point common to said fifth and sixth switching means, said second source of A-C control signals being connected to alternately render said fifth and sixth switching means conductive in a 180° out-of-phase relationship with respect to said third and fourth switching means, respectively, whereby said output circuit is balanced with respect to said fixed reference potential.

16. The combination of claim 15 in which said input signal connecting means comprises first means energized by said input signal and connected between the input terminal of said first switching means and said fixed reference potential for applying to said first switching means a first signal proportional to said modulated carrier input signal, and second means coupled to said source and connected between the input terminal of said second switching means and said fixed reference potential for applying to said second switching means a second signal proportional to said modulated carrier input signal, said first and second signals being 180° out of phase.

17. The combination of claim 16 in which said coupling means comprises means for resistively coupling a point common to the output terminals of said first and second switching means to a point common to the input sides of said third and fourth switching means.

18. The combination of claim 17 in which said first and second voltage providing means each comprises a capacitance of given value connected between said fixed reference potential and the output terminals of said third and fourth switching means, respectively, the resistance of said resistive coupling means and said given value of capacitance being such that they provide a time constant which is long with respect to the period of said A-C control signals.

19. The combination of claim 5 in which said voltage providing means comprises a resistance and a capacitance series connected in the order named between a point common to the output terminals of said third and fourth switching means and said fixed reference potential, and said input signal connecting means comprising means for applying said input signals between a point common to the input terminals of said first and second switching means and said fixed reference potential, whereby a D-C output signal proportional to the modulation information present on said preferred phase component appears on said capacitance.

20. The combination of claim 19 in which said coupling means comprises a transformer having center-tapped primary and secondary windings, means for connecting the first and second ends of said primary winding to the output terminals of said first and second switching means, respectively, means to connect said center taps to said fixed reference potential, and means for connecting the first and second ends of said secondary winding to the input terminals of said third and fourth switching means, respectively.

References Cited

UNITED STATES PATENTS

| | | | |
|---|---|---|---|
| 2,698,392 | 12/1954 | Herman | 329—50 X |
| 2,900,506 | 8/1959 | Whetter | 307—88.5 |
| 2,994,044 | 7/1961 | Straube | 307—88.5 |
| 3,025,418 | 3/1962 | Brahm | 328—134 X |

ROY LAKE, *Primary Examiner.*

ALFRED L. BRODY, *Examiner.*